US006784654B2

United States Patent
Fujiyama et al.

(10) Patent No.: US 6,784,654 B2
(45) Date of Patent: Aug. 31, 2004

(54) SIGNAL REPRODUCTION BLOCK

(75) Inventors: Hirokuni Fujiyama, Osaka (JP);
Takashi Morie, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 31 days.

(21) Appl. No.: 10/243,688

(22) Filed: Sep. 16, 2002

(65) Prior Publication Data

US 2003/0052698 A1 Mar. 20, 2003

(30) Foreign Application Priority Data

Sep. 17, 2001 (JP) ........................................ 2001-280960

(51) Int. Cl.$^7$ .......................... G01R 23/165; G11B 5/09

(52) U.S. Cl. .................................. 324/76.29; 369/47.1

(58) Field of Search ........................... 324/76.29, 76.44, 324/76.52, 76.22, 613, 620, 607, 523, 76.28; 369/47.39, 47.1

(56) References Cited

U.S. PATENT DOCUMENTS 5,598,396 A * 1/1997 Horibe et al. ............ 369/47.25
5,982,228 A 11/1999 Khorramabadi et al.
6,236,632 B1 * 5/2001 Hayashi .................... 369/59.16

* cited by examiner

*Primary Examiner*—N. Le
*Assistant Examiner*—Amy He
(74) *Attorney, Agent, or Firm*—McDermott Will & Emery LLP

(57) ABSTRACT

In a signal reproduction block of a DVD reproduction apparatus, an output signal line for outputting a characteristic information signal representing a characteristic of a filter incorporated in the signal reproduction block to the outside is additionally provided on the output side of an A/D converter. In this way, it is possible to prevent an analog data signal from deteriorating during a data signal reproduction process due to a parasitic effect of the output signal line. Moreover, the filter characteristic information signal is output through the output signal line after it is convened to a digital signal by the A/D convener, thereby avoiding the deterioration the characteristic information signal and thus improving the measurement precision.

8 Claims, 8 Drawing Sheets

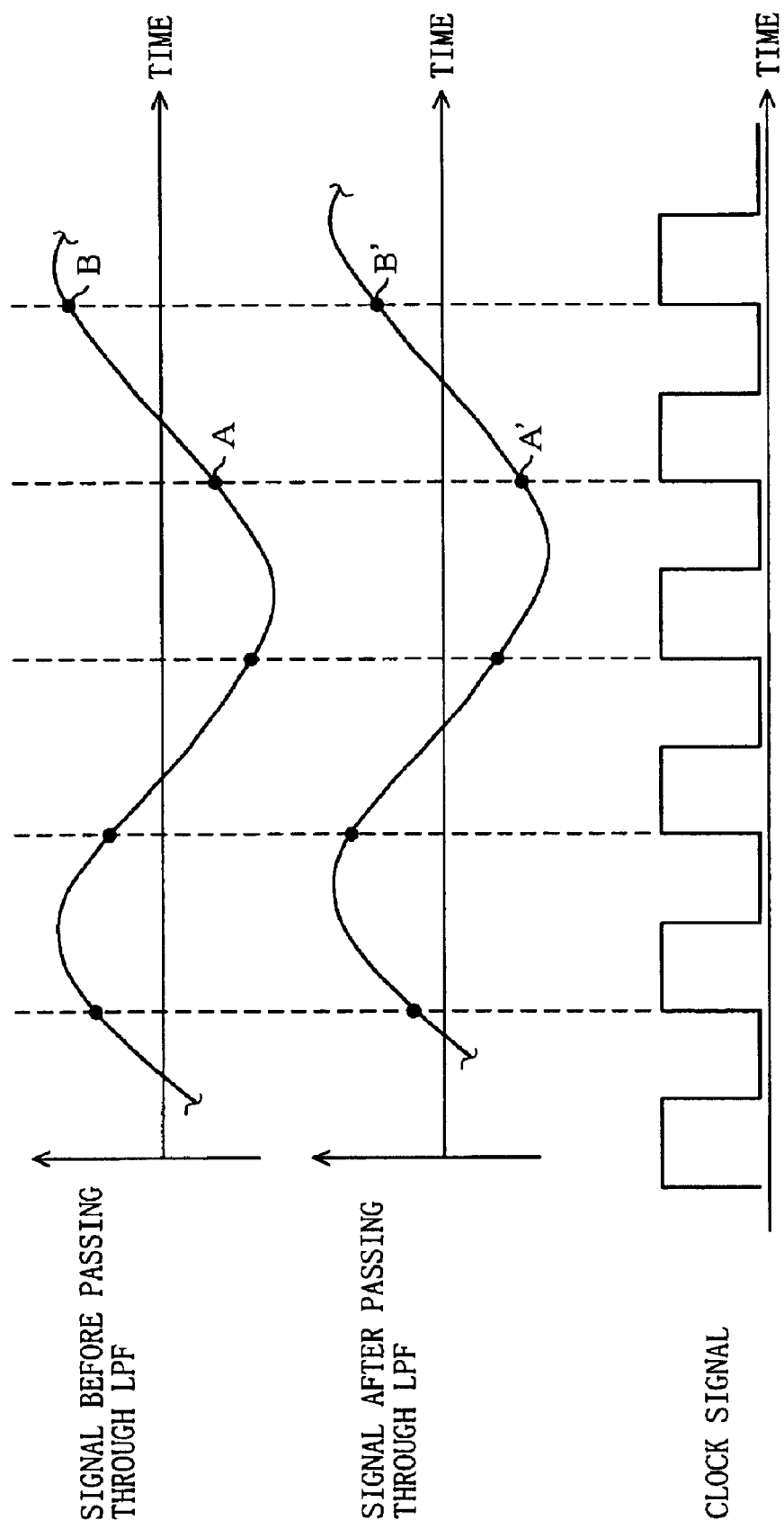

SIGNAL REPRODUCTION BLOCK

BACKGROUND OF THE INVENTION

The present invention relates to a signal reproduction block in a disk apparatus such as a DVD reproduction apparatus for reproducing a signal of data read out from a disk such as an optical disk and more particularly to a technique for avoiding an adverse influence of an output signal line on a data signal reproduction process in a case where the output signal line is additionally provided for a characteristic information signal representing a characteristic of a filter that is incorporated in the signal reproduction block.

Typically, in a circuit chip in which a low pass filter (hereinafter referred to as an "LPF") is incorporated, an input signal is input to a variable gain amplifier 51 (hereinafter referred to as a "VGA") via a signal line 501, and the signal is subjected to gain adjustment in the VGA 51, after which it is input to an LPF 52 via a signal line 502, as illustrated in FIG. 7. During a filter characteristic measurement process, a characteristic information signal, which is obtained by inputting a test signal to the LPF 52, is input to a buffer 61 via a signal line 601, and the drivability thereof is increased through the buffer 61, after which the characteristic information signal is taken to the outside of the circuit chip via a signal line 602. Then, outside the circuit chip, a characteristic of the LPF 52 such as the gain, the phase or the group delay is measured by using a measuring apparatus.

An example in which a filter is incorporated as described above is a signal reproduction block in a disk apparatus such as a DVD reproduction apparatus for reading out data written on a disk so as to reproduce a signal of the data.

The signal reproduction block operates as follows during a signal reproduction process. Referring to FIG. 8, an analog signal of data read out from the disk is amplified by a pre-amplifier, and then input to the VGA 51 via the signal line 501 for gain adjustment, after which the signal is input to the LPF 52 via the signal line 502 for waveform equalization. The output signal from the LPF 52 is passed to an A/D converter 53 via a signal line 503 so as to be converted to a digital signal, which is then passed to a digital signal processing section 54 via a signal line 504, where the signal is reproduced by digital processing. Then, the signal is output to a controller (not shown) in the following stage via a signal line 505.

The signal reproduction block described above may be provided with the function of outputting a filter characteristic information signal as that of the circuit chip described above by providing the output signal line 601 for taking out the characteristic information signal representing a characteristic of the LPF 52 so that the output signal line 601 diverges from the signal line 503 between the LPF 52 and the A/D converter 53, with the buffer 61 being provided along the output signal line 601, as illustrated in FIG. 8 in the area delimited by a phantom line.

In the signal reproduction block, however, a parasitic effect occurs due to the presence of the output signal line 601. Then, during the process of reproducing a data signal, the signal along the data signal path for performing the signal reproduction process may be deteriorated, thus adversely influencing the reproduction process.

SUMMARY OF THE INVENTION

An object of the present invention is to make it possible to ensure reliable reproduction of a data signal by suppressing the deterioration of the data signal due to a parasitic effect of an output signal line additionally provided for a filter characteristic information signal during the data signal reproduction process, in a case where a signal reproduction block of a disk apparatus such as a DVD reproduction apparatus is provided with a function of outputting a characteristic information signal during a filter characteristic measurement process.

In view of the fact that a signal along the data signal path for performing a signal reproduction process is an analog signal between the filter and an A/D converter but is a digital signal on the output side of the A/D converter, the present invention provides an output signal line for outputting the filter characteristic information signal to the outside on the output side of the A/D converter, whereby when a data signal is reproduced the signal is prevented from deteriorating due to the parasitic effect of the output signal line.

Specifically the present invention provides a signal reproduction block, including: a filter for waveform equalization of an analog input signal; an A/D converter for converting an output signal from the filter to a digital signal; a digital signal processing section for reproducing an output signal from the A/D converter; and an output signal line through which a characteristic information signal that is obtained by inputting a test signal to the filter is output to an outside of the signal reproduction block during a characteristic measurement process of measuring a characteristic of the filter, wherein the output signal line is provided on an output side of the A/D converter.

With such a configuration, when reproducing a data signal, the data signal read out from a disk is still an analog signal after the signal passes through the filter, but is a digital signal on the output side of the A/D converter. Since the output signal line for outputting the characteristic information signal to the outside of the signal reproduction block during the filter characteristic measurement process is located on the output side of the A/D converter, it is possible to prevent the signal from being deteriorated during the signal reproduction process due to a parasitic effect of the output signal line.

Moreover, since the characteristic information signal is output after it is converted to a digital signal by the A/D converter, the deterioration thereof is reduced as compared with a case where the characteristic information signal is output as an analog signal thus improving the measurement precision accordingly. Note that "filter characteristic" as used herein is not limited to the group delay characteristic which is discussed in detail below in the description of the embodiments of the invention, but may alternatively be other characteristics such as the gain characteristic or the phase characteristic.

In one embodiment of the invention, an input signal to the filter is a differential signal the signal reproduction block further including: a bypass signal line for taking out an unfiltered signal to be input to the filter; and a signal selection circuit for receiving the unfiltered signal taken out by the bypass signal line and a filtered signal output from the filter, and for simultaneously outputting the unfiltered signal and the filtered signal to the A/D converter during the characteristic measurement process while outputting only the filtered signal to the A/D converter during a signal reproduction process.

With such a configuration, two signals, i.e., the unfiltered signal and the filtered signal, are A/D-converted simultaneously during the characteristic measurement process. Moreover, during the signal reproduction process, only the filtered signal is input to the A/D converter by the signal selection circuit, whereby the signal reproduction process is not hindered. Note that since the bypass signal line is arranged within the analog circuit and has a small path length the deterioration of the data signal due to the parasitic effect of the bypass signal line is practically negligible as compared with a case where the output signal line is extended to the outside of the signal reproduction block diverging from a signal line on the output side of the filter (see FIG. 8).

In one embodiment of the invention, the signal reproduction block further includes a calculation section provided on the output signal line for calculating and outputting a time difference between the unfiltered signal and the filtered signal, which have been converted to digital signals by the A/D converter. With such a configuration, the delay characteristic of the filter is obtained.

In one embodiment of the invention, the test signal is a signal of a single frequency. Note that there may be only one type of test signal, or there may be a plurality of test signals of different frequencies. With such a configuration, measurement with a high precision can be easily performed, as compared with a case where test signals have a plurality of frequencies.

In one embodiment of the invention, the signal reproduction block further includes a test signal generation circuit for generating the test signal. With such a configuration, it is no longer necessary to provide a test signal generation circuit that is external to the signal reproduction block.

In one embodiment of the invention, the test signal generation circuit is configured so as to generate a plurality of test signals of different frequencies. With such a configuration, it is possible to measure the filter characteristic for each of the frequencies of test signals generated by the test signal generation circuit.

In one embodiment of the invention, the test signal generation circuit includes: a basic signal generation circuit for generating a basic signal of a single frequency; and a signal conversion circuit for converting the basic signal generated by the basic signal generation circuit to a plurality of test signals of different frequencies. With such a configuration, the function of the test signal generation circuit is specifically implemented.

In one embodiment of the invention, the signal reproduction block further includes a clock circuit for generating a clock signal, wherein the basic signal generation circuit of the test signal generation circuit is the clock circuit. With such a configuration, it is possible to provide the basic signal generation circuit without increasing the circuit area.

In one embodiment of the invention, the signal conversion circuit of the test signal generation circuit is provided outside the signal reproduction block. With such a configuration, the adjustment of test signals according to the measurement conditions can be performed easily, as compared with a case where the signal conversion circuit is provided within the signal reproduction block.

BRIEF DESCRIPTION OF THE DRAWINGS

FIG. 4 is a timing diagram illustrating a sampling operation of an A/D converter when sampling an unfiltered test signal and that when sampling a filtered test signal.

DESCRIPTION OF THE INVENTION

Preferred embodiments of the present invention will now be described with reference to the drawings.

First Embodiment

Figure 1:
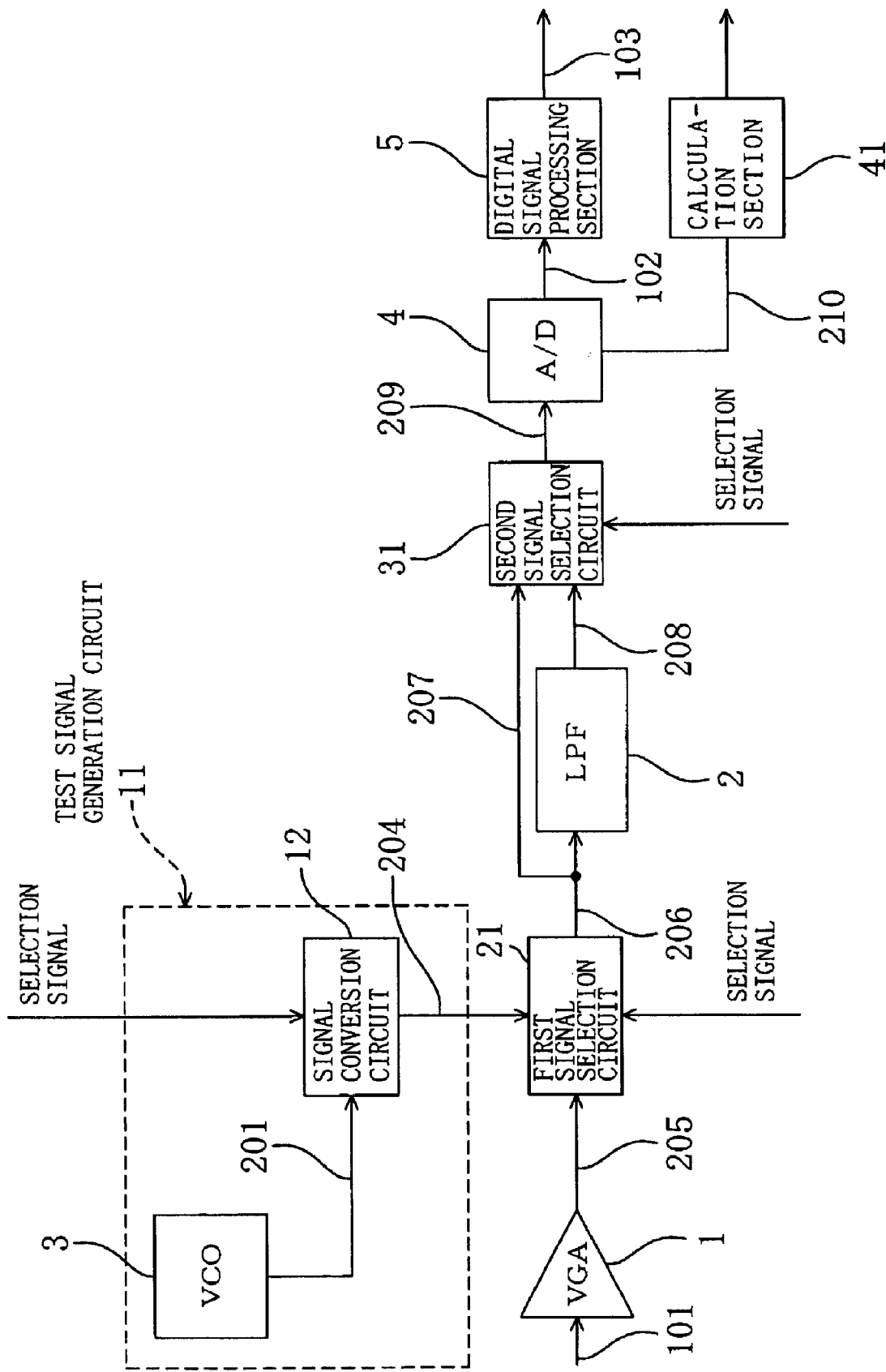
FIG. 1 is a circuit diagram illustrating a general configuration of a signal reproduction block according to the first embodiment of the present invention.

FIG. 1 illustrates a configuration of a signal reproduction block of a DVD reproduction apparatus according to the first embodiment of the present invention. In the signal reproduction block, a signal is processed as a differential signal. In order to input a test signal to a filter incorporated in the signal reproduction block to measure the group delay characteristic of the filter, the signal reproduction block is provided with a function of generating the test signal a function of calculating a delay time for each frequency, and a function of outputting the delay information to the outside of the signal reproduction block.

Although not shown, the signal reproduction block is provided with a preamplifier for amplifying an analog signal of data that is read out from a disk by a read block of the DVD reproduction apparatus. A signal line 101 extends from the pre-amplifier, and a VGA 1 (variable gain amplifier) for adjusting the gain of the output signal from the pre-amplifier is provided at the output-side end of the signal line 101. An LPF 2 (low pass filter) for waveform equalization of the signal whose gain has been adjusted by the VGA 1 is provided on the output side of the VGA 1. The LPF 2 is the filter whose group delay characteristic is to be measured.

An A/D converter 4 is provided on the output side of the LPF 2. The A/D converter 4 converts an analog signal output from the LPF 2 to a digital signal based on a clock signal of a single frequency that is generated by a voltage controlled oscillator 3 (hereinafter referred to as "VCO") provided in the signal reproduction block. A signal line 102, through which signals are output from the A/D converter 4 during the signal reproduction process, is provided on the output side of the A/D converter 4. A digital signal processing section 5 is provided at the output-side end of the signal line 102. The digital signal processing section 5 performs a reproduction operation by digitally processing the output signal from the A/D converter 4 based on the clock signal from the VCO 3. A signal line 103, through which signals that have been digitally processed by the digital signal processing section 5 are output to the following block in the DVD reproduction apparatus, is provided on the output side of the digital signal processing section 5.

In the present embodiment, a test signal generation circuit 11 is provided for generating a test signal, which is input to the LPF 2 when measuring the group delay characteristic of the LPF 2. The test signal generation circuit 11 includes the VCO 3 (a clock circuit and a basic signal generation circuit), and a signal conversion circuit 12 connected to the VCO 3 via a signal line 201 for converting the clock signal output from the VCO 3 to a plurality of test signals having different frequencies.

Figure 2:
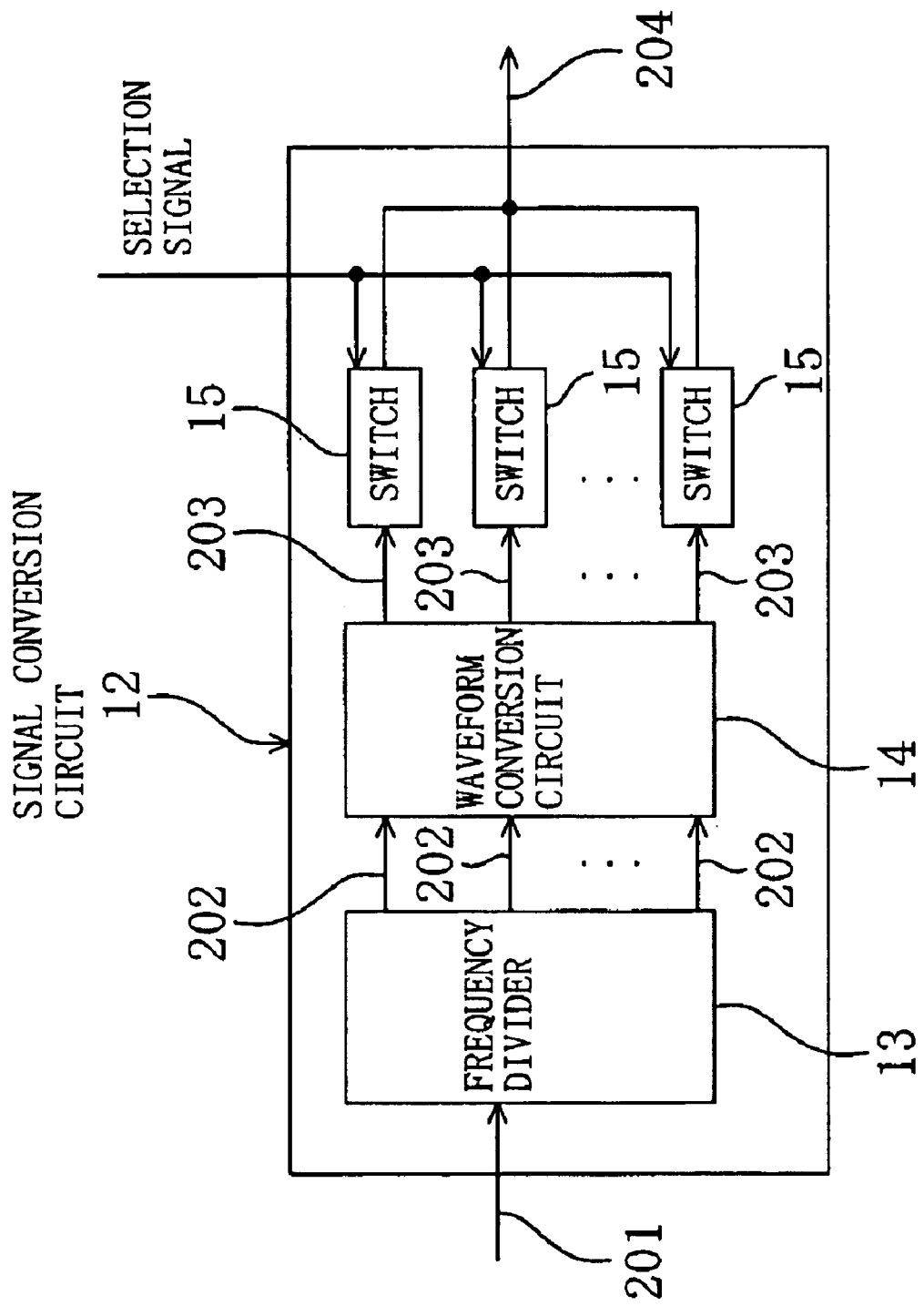
FIG. 2 is a circuit diagram illustrating a configuration of a test signal generation circuit.

Referring to FIG. 2, the signal conversion circuit 12 includes a frequency divider 13, a waveform conversion circuit 14, and a plurality of switches 15, 15, . . . . The frequency divider 13 divides the clock signal (basic signal) of a single frequency (predetermined period T) from the VCO 3 into a plurality of signals of different periods (T, 2T, . . . , 2nT), which are output in parallel through a plurality of signal lines 202, 202, . . . , respectively. The waveform conversion circuit 14 converts each signal output from the frequency divider 13 to a sinusoidal signal by using an RC filter or the like. The switches 15, 15, . . . , are used to selectively output one of the plurality of test signals, which have been output from the waveform conversion circuit 14 via a plurality of signal lines 203, 203, . . . , respectively. The switches 15, 15, . . . , receive selection signals for successively turning ON the switches 15, 15, . . . , so that the test signals are successively output from the signal conversion circuit 12 during the filter characteristic measurement process. The test signals generated as described above are output from the test signal generation circuit 11 via a signal line 204.

Referring to FIG. 1, a first signal selection circuit 21 is provided between the VGA 1 and the LPF 2. The first signal selection circuit 21 selectively outputs one of the test signal from the test signal generation circuit 11 and the output signal from the VGA 1. The first signal selection circuit 21 includes two input terminals and one output terminal. The signal line 204 extending from the test signal generation circuit 11 is connected to one of the input terminals, and a signal line 205 extending from the output terminal of the VGA 1 is connected to the other one of the input terminals. The first signal selection circuit 21 receives a selection signal for selecting a signal to be output during the characteristic measurement process and during the signal reproduction process so that the test signal from the test signal generation circuit 11 is output during the characteristic measurement process, and the data signal from the VGA 1 is output during the signal reproduction process. The output terminal of the first signal selection circuit 21 is connected to the input terminal of the LPF 2 by a signal line 206.

Moreover, the signal reproduction block of the present embodiment further includes a bypass signal line 207, and a second signal selection circuit 31 provided between the LPF 2 and the A/D converter 4. The bypass signal line 207 is provided for by passing an unfiltered signal on the signal line 206, which is a signal that has been output from the first signal selection circuit 21 and that is to be input to the LPF 2. The second signal selection circuit 31 receives the unfiltered signal bypassed through the bypass signal line 207, and the filtered signal output from the LPF 2. The second signal selection circuit 31 simultaneously outputs the unfiltered signal and the filtered signal to the A/D converter 4 during the characteristic measurement process, whereas the second signal selection circuit 31 outputs only the filtered signal to the A/D converter 4 during the signal reproduction process.

Specifically, one end of the bypass signal line 207 is connected to the signal line 206 between the VGA 1 and the LPF 2, and the other end thereof is connected to the input side of the second signal selection circuit 31. Moreover, a signal line 208, through which the filtered signal is input to the second signal selection circuit 31, is provided between the LPF 2 and the second signal selection circuit 31. A signal line 209, through which the output signal from the second signal selection circuit 31 is input to the A/D converter 4, is connected to the output terminal of the second signal selection circuit 31.

Figure 3A:
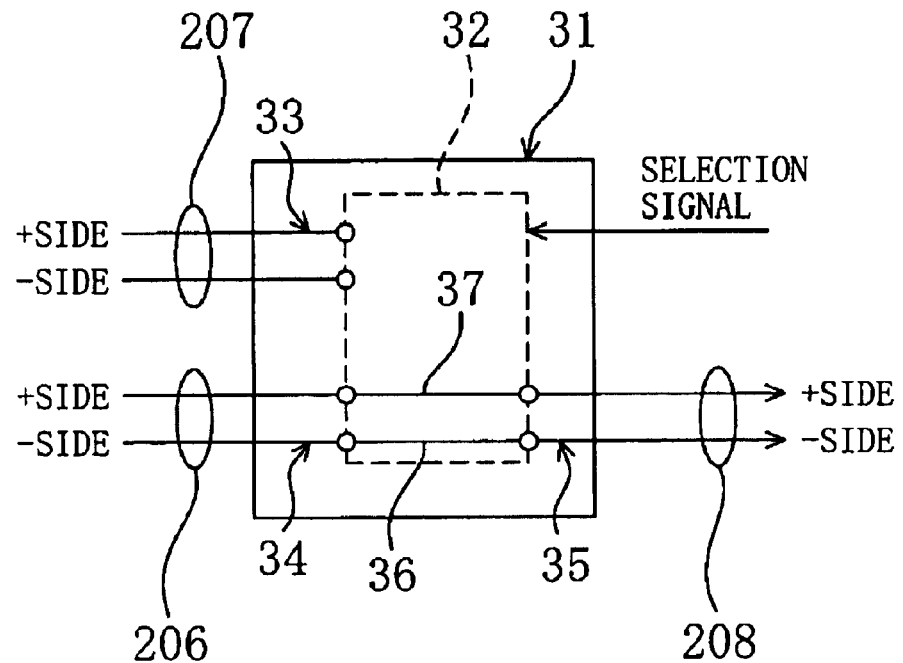
FIG. 3A is a diagram illustrating an operation of a first signal selection circuit during a signal reproduction process.
Figure 3B:
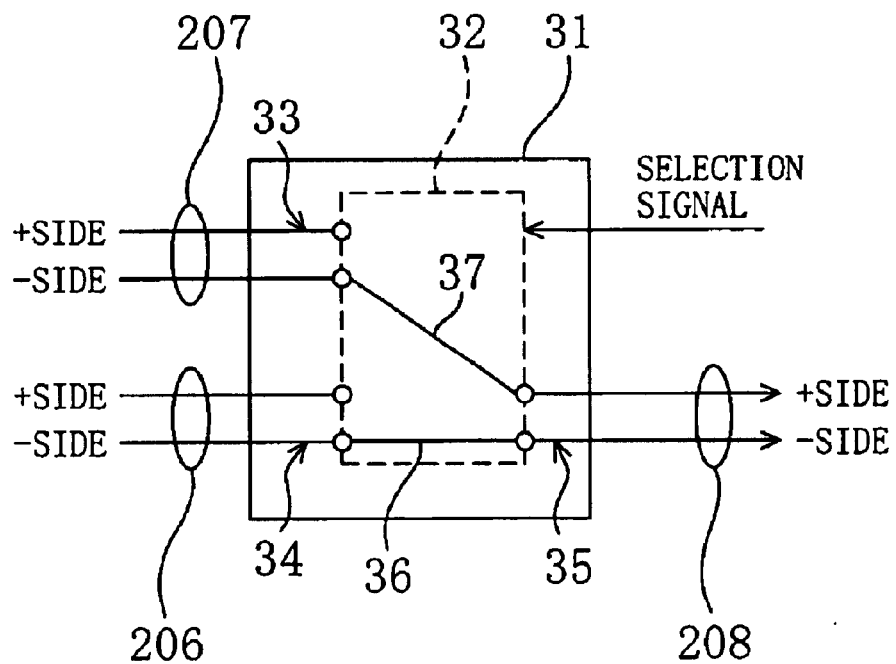
FIG. 3B is a diagram illustrating an operation of the first signal selection circuit during a characteristic measurement process.

Referring to FIG. 3A and FIG. 3B, the second signal selection circuit 31 is provided with a switch section 32 for selectively outputting a differential signal (a pair of signal components including a (+) side signal component and a (−) side signal component) input to the second signal selection circuit 31. The switch section 32 includes an input section 33 for receiving the unfiltered signal, to which the (+) side line and the (−) side line of the bypass signal line 207 are connected, an input section 34 for receiving the filtered signal, to which the (+) side line and the (−) side line of the signal line 208 extending from the LPF 2 are connected, an output section 35 for outputting the selected signal, and a fixed connector 36 and a movable connector 37, which are provided between the input sections 33 and 34 and the output section 35. The (−) side terminal of the input section 34 for receiving the filtered signal and the (−) side terminal of the output section 35 are always connected to each other by the fixed connector 36 so that one signal component (the (−) side signal component) of the filtered differential signal is always output. On the other hand, the input terminal of the movable connector 37 is selectively connected to one of the (−) side terminal of the input section 33 for receiving the unfiltered signal and the (+) side terminal of the input section 34 for receiving the filtered signal, and the output terminal of the movable connector 37 is fixed to the (+) side terminal of the output section 35 so that one of a signal component (the (+) side signal component) of the filtered differential signal and a signal component (the (−) side signal component) of the unfiltered differential signal is selectively output.

The switch section 32 receives a selection signal for selecting the output signal of the second signal selection circuit 31 during the characteristic measurement process and during the signal reproduction process. During the normal signal reproduction process, the input-side end of the movable connector 37 is connected to the (+) side terminal of the input section 34, as illustrated in FIG. 3A, whereby the filtered differential signal is output, as it is, to the A/D converter 4. On the other hand, during the characteristic measurement process, the input-side end of the movable connector 37 is connected to the (−) side terminal of the input section 33 for receiving the unfiltered signal, as illustrated in FIG. 3B, whereby a signal component (the (−) side signal component) of the unfiltered differential signal and a signal component (the (−) side signal component) of the filtered differential signal are output to the A/D converter 4 at the same timing.

Referring to FIG. 4, at each rising edge of the clock signal which triggers the A/D converter 4, the A/D converter 4 samples each of the unfiltered signal and the filtered signal and converts each of the sampled analog signal values to an n-digit digital signal value ranging from (00 . . . 0) to (11 . . . 1). The number of digits, n, is a value that is determined based on the conversion precision of the A/D converter 4.

Moreover, the signal reproduction block of the present embodiment further includes an output signal line 210, through which the characteristic information signal representing the group delay characteristic of the LPF 2 is output to the outside of the signal reproduction block during the characteristic measurement process, in addition to the signal line 102, through which the output signal from the A/D converter 4 is input to the digital signal processing section 5 during the data signal reproduction process. A calculation section 41 is provided along the output signal line 210 for calculating the time difference between the unfiltered signal and the filtered signal, which have been converted to digital values by the A/D converter 4.

Figure 5:
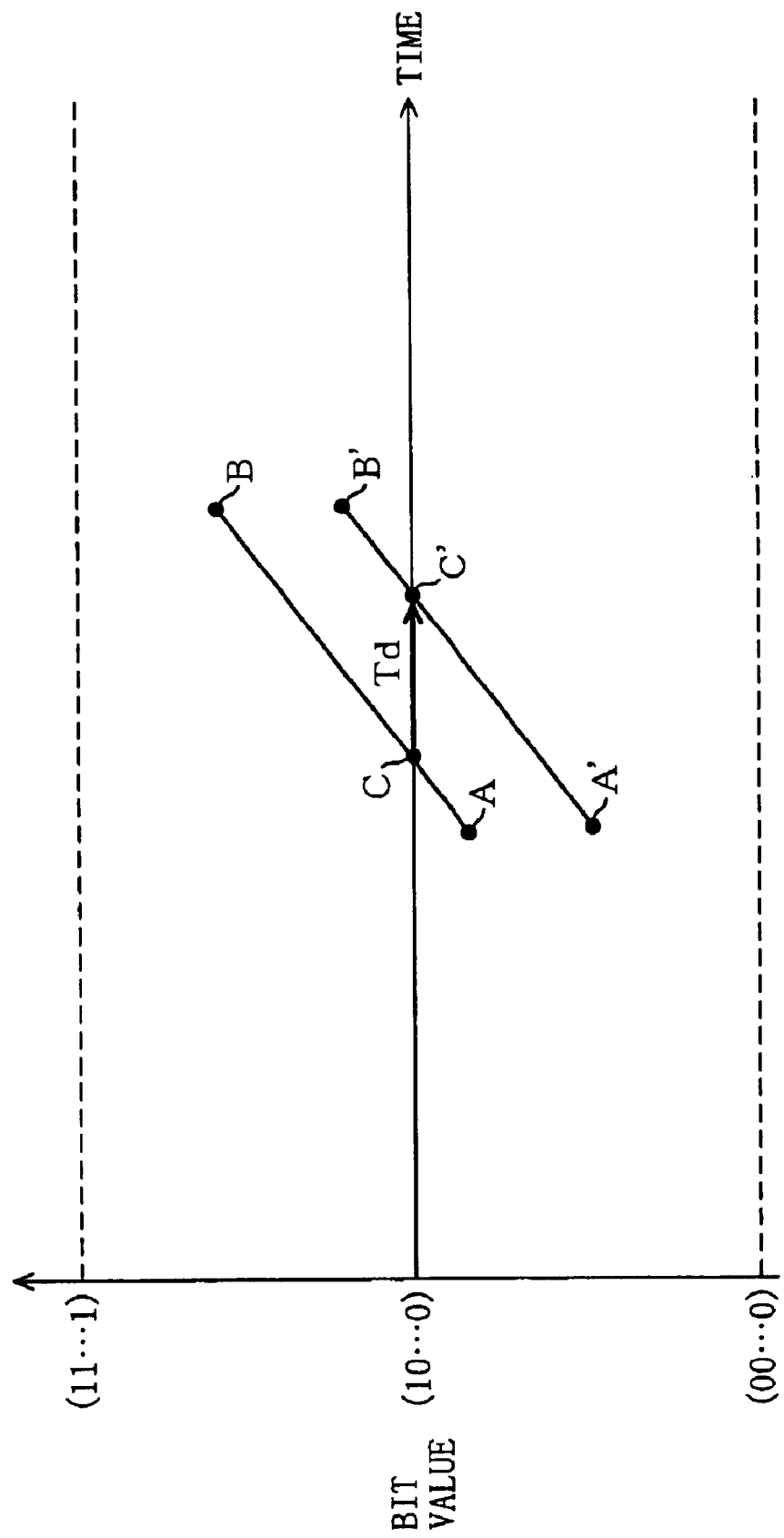
FIG. 5 is a diagram illustrating the calculation of a time difference between an unfiltered signal and a filtered signal.

The calculation section 41 compares two digital signal values that are successively input from the A/D converter 4, for each of the unfiltered signal and the filtered signal, and obtains the zero-crossing point from the two digital signal values by a linear interpolation operation only when the most significant bits of the two digital signal values have opposite signs. In this case, the zero-crossing point is a digital value that corresponds to the central voltage value of the sinusoidal input signal. This will be described more specifically referring to FIG. 5. If a zero-crossing point C is obtained from two sampling points A and B for the unfiltered signal while a zero-crossing point C' is obtained from two sampling points A' and B' for the filtered signal, the time difference Td between the two zero-crossing points C and C' is obtained. The time difference Td corresponds to the delay of the filtered signal with respect to the unfiltered signal. Note that the digital processing operation performed by the calculation section 41 is not limited to the linear interpolation operation as described above. Alternatively, a waveform approximation operation may be performed by using two or more digital values that have been sampled successively so as to obtain a zero-crossing point and to obtain the delay value between the unfiltered signal and the filtered signal.

Next, an operation of the signal reproduction block having such a configuration during the characteristic measurement process will be described.

In the signal reproduction block described above, the clock signal output from the VCO 3 is input to the frequency divider 13 of the signal conversion circuit 12 via the signal line 201. In the frequency divider 13, the received clock signal is divided into a plurality of signals of different periods, which are input to the waveform conversion circuit 14 via the signal lines 202, 202, . . . In the waveform conversion circuit 14, each signal received is converted to a sinusoidal signal of the same period. In this way, a plurality of sinusoidal test signals of different frequencies are generated. The test signals are input to the switches 15, 15, . . . , via the signal lines 203, 203, . . . The switches 15, 15, . . . , which are controlled by selection signals successively output the test signals according to the selection signals. The test signal output from the signal conversion circuit 12 is input to the first signal selection circuit 21 via the signal line 204.

According to the selection signal input to the first signal selection circuit 21, the first signal selection circuit 21 selects one of the signal, which is input thereto via the signal line 205, i.e., the data signal read out from the disk, and the test signal, which is input thereto via the signal line 204. The data signal is selected during the normal signal reproduction process, whereas the test signal is selected during the characteristic measurement process. The selected signal is output to the LPF 2 via the signal line 206, and to the second signal selection circuit 31 via the signal line 206 and the bypass signal line 207.

The second signal selection circuit 31 receives the unfiltered signal from the bypass signal line 207 and the filtered signal from the LPF 2. According to the selection signal input to the second signal selection circuit 31, the second signal selection circuit 31 selects one of a signal component (the (−) side signal component) of the unfiltered differential signal and a signal component (the (+) side signal component) of the filtered differential signal. The signal component (the (+) side signal component) of the filtered differential signal is selected during the signal reproduction process, whereas the signal component (the (−) side signal component) of the unfiltered differential signal is selected during the characteristic measurement process. The selected signal component is output to the A/D converter 4 simultaneously with the other signal component (the (−) side signal component) of the filtered differential signal.

During the characteristic measurement process, the A/D converter 4 converts the unfiltered test signal and the filtered test signal to digital values, and the digital values are input to the calculation section 41 via the output signal line 210. The calculation section 41 digitally calculates the delay time by which the test signal has been delayed through the LPF 2, and the calculation result is output, as the group delay information of the LPF 2, to the outside of the signal reproduction block via the output signal line 210.

Thus, according to the present embodiment, the output signal line 210 for outputting, to the outside of the signal reproduction block, the characteristic information signal representing the group delay characteristic, which is obtained by inputting test signals to the LPF 2 incorporated in the signal reproduction block of the DVD reproduction apparatus, is additionally provided on the output side of the A/D converter 4. As a result, it is possible to prevent signals from deteriorating during the data signal reproduction process due to the parasitic effect of the output signal line 210, thus avoiding an adverse influence on the signal processing operation during the signal reproduction process.

In addition, because the output signal line 210 is provided on the output side of the A/D converter 4, an analog characteristic information signal can be converted to a digital signal before it is output thereby avoiding the deterioration of the characteristic information signal. Therefore, it is possible to measure the group delay characteristic with a high precision as compared with a case where the characteristic information signal is output to the outside as an analog signal.

Note that while the waveform of the test signal is sinusoidal in the embodiment described above, the waveform of the test signal may alternatively be any of various waveforms such as triangular.

Moreover, while the test signal generation circuit 11 is provided within the signal reproduction block in the present embodiment, it may alternatively be provided outside the signal reproduction block. In such a case, the test signal generation circuit may be, for example, a signal oscillator having a signal waveform conversion function and a frequency control function.

Furthermore, the group delay characteristic is measured as a filter characteristic in the embodiment described above, the gain characteristic, the phase characteristic, or the like, may alternatives be measured.

Second Embodiment

Figure 6:
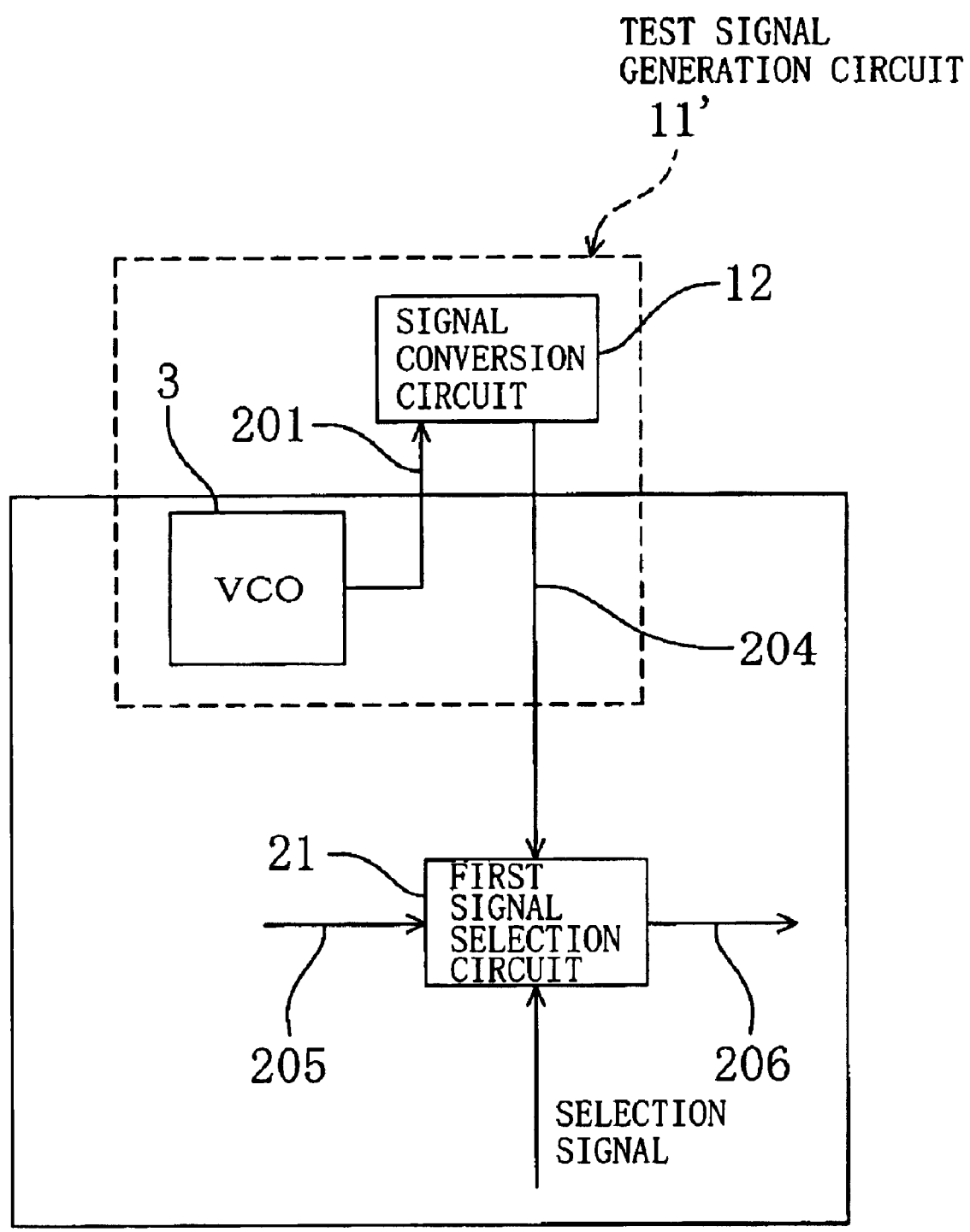
FIG. 6 is a diagram illustrating a configuration of an important part of a signal reproduction block according to the second embodiment of the present invention.
Figure 7:
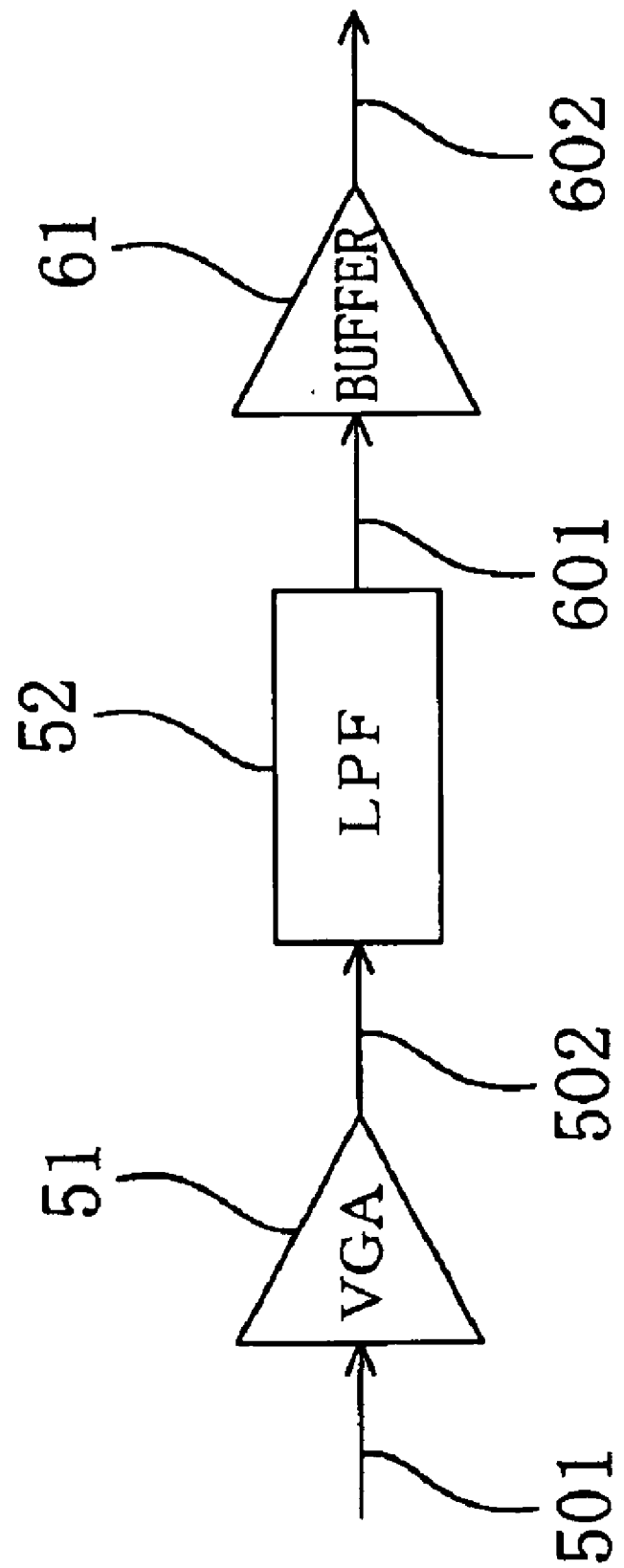
FIG. 7 is a circuit diagram illustrating a configuration of a typical circuit chip that is provided with a function of outputting a filter characteristic information signal.
Figure 8:
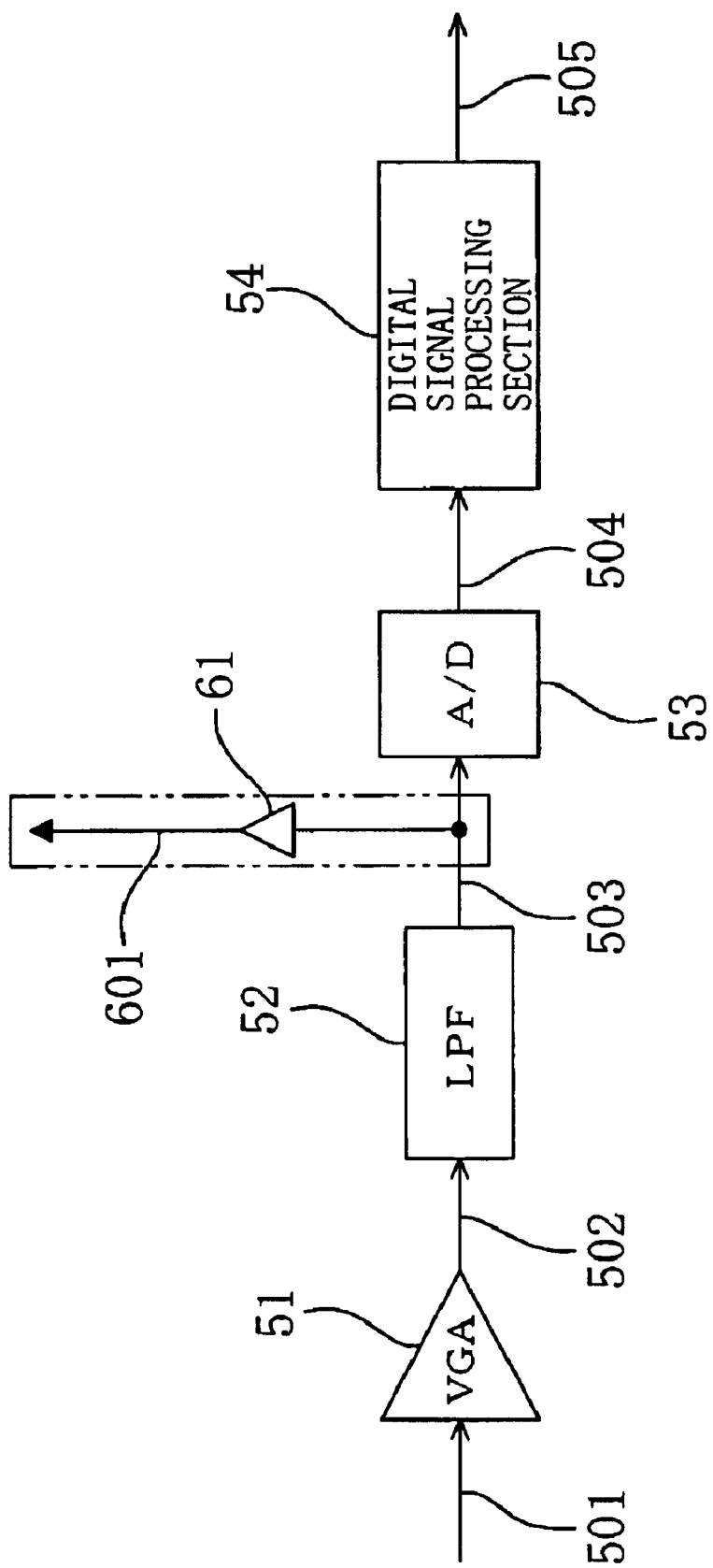
FIG. 8 is a diagram illustrating an example where a signal reproduction block of a DVD reproduction apparatus is provided with the function of outputting a filter characteristic information signal.

FIG. 6 illustrates a configuration of an important part of a signal reproduction block according to the second embodiment of the present invention. Note that elements in FIG. 6 that are already illustrated in the first embodiment are denoted by the same reference numerals.

In the present embodiment, the signal conversion circuit 12 of the test signal generation circuit 11 is provided outside the signal reproduction block being delimited by a solid line in FIG. 6. In such a case, in addition to the configuration as illustrated in the first embodiment, the signal conversion circuit 12 may take other configurations. For example, the signal conversion circuit 12 may be a signal processing LSI having a signal waveform conversion function and a frequency control function, or a software-controlled circuit using a program that implements such functions. Note that other than this, the configuration is the same as that of the first embodiment and will not be further described below.

With the test signal generation circuit 11 of the signal reproduction block having such a configuration as described above, the clock signal output from the VCO 3 is once taken out of the signal reproduction block via the signal line 201, and the signal conversion circuit 12 converts the signal to a sinusoidal signal while controlling the frequency thereof, during the group delay characteristic measurement process. Since the processing operations by the signal conversion circuit 12 are performed outside the signal reproduction block, an adjustment that may be difficult to perform inside the signal reproduction block can be easily performed according to the circumstances. The test signals generated as described above are pulled back into the signal reproduction block via the signal line 204, and input to the first signal selection circuit 21. Thereafter, the operation is the same as that of the first embodiment, and will not be further described below.

Thus, according to the present embodiment, it is possible to easily perform an adjustment according to the circumstances during the test signal generation, in addition to the effects as those of the first embodiment.

What is claimed is:

1. A signal reproduction block, comprising:
a filter for waveform equalization of an analog input signal;
an A/D converter for converting an output signal from the filter to a digital signal;
a digital signal processing section for reproducing an output signal from the A/D converter; and
an output signal line through which a characteristic information signal that is obtained by inputting a test signal to the filter is output to an outside of the signal reproduction block during a characteristic measurement process of measuring a characteristic of the filter,
wherein the output signal line is provided on an output side of the A/D converter;
wherein an input signal to the filter is a differential signal;
a bypass signal line for taking out an unfiltered signal to be input to the filter; and
a signal selection circuit for receiving the unfiltered signal taken out by the bypass signal line
and a filtered signal output from the filter, and for simultaneously outputting the unfiltered signal and the filtered signal to the A/D converter during the characteristic measurement process while outputting only the filtered signal to the A/D converter during a signal reproduction process.

2. The signal reproduction block of claim 1, further comprising a calculation section provided on the output signal line for calculating a time difference between the unfiltered signal and the filtered signal, which have been converted to digital signals by the A/D converter.

3. The signal reproduction block of claim 1, wherein the test signal is a signal of a single frequency.

4. The signal reproduction block of claim 1, further comprising a test signal generation circuit for generating the test signal.

5. The signal reproduction block of claim 4, wherein the test signal generation circuit is configured so as to generate a plurality of test signals of different frequencies.

6. The signal reproduction block of claim 5, wherein the test signal generation circuit includes:
a basic signal generation circuit for generating a basic signal of a single frequency; and
a signal conversion circuit for converting the basic signal generated by the basic signal generation circuit to a plurality of test signals of different frequencies.

7. The signal reproduction block of claim 6, further comprising a clock circuit for generating a clock signal, wherein the basic signal generation circuit of the test signal generation circuit is the clock circuit.

8. The signal reproduction block of claim 7, wherein the signal conversion circuit of the test signal generation circuit is provided outside the signal reproduction block.

* * * * *